(12) United States Patent
Wu et al.

(10) Patent No.: US 11,231,080 B2
(45) Date of Patent: Jan. 25, 2022

(54) MECHANICAL FORCE-AMPLIFYING TYPE MOTOR-DRIVEN FRICTION BRAKING DEVICE FOR RAIL VEHICLE

(71) Applicant: BEIJING TIANYOUXINPEI HIGH-TECH CO., LTD., Beijing (CN)

(72) Inventors: Mengling Wu, Shanghai (CN); Maolin Chen, Shanghai (CN); Chun Tian, Shanghai (CN); Shun Peng, Shanghai (CN); Fulei Feng, Shanghai (CN); HanWen Zhang, Shanghai (CN); JingJing Weng, Shanghai (CN)

(73) Assignee: Beijing Tianyouxinpei High-tech Co., Ltd., Beijing (CN)

( * ) Notice: Subject to any disclaimer, the term of this patent is extended or adjusted under 35 U.S.C. 154(b) by 56 days.

(21) Appl. No.: 16/643,541

(22) PCT Filed: Sep. 6, 2017

(86) PCT No.: PCT/CN2017/100632
§ 371 (c)(1),
(2) Date: Feb. 29, 2020

(87) PCT Pub. No.: WO2019/047047
PCT Pub. Date: Mar. 14, 2019

(65) Prior Publication Data
US 2020/0200228 A1  Jun. 25, 2020

(51) Int. Cl.
*F16D 65/14* (2006.01)
*B61H 13/20* (2006.01)
(Continued)

(52) U.S. Cl.
CPC ............. *F16D 65/14* (2013.01); *B61H 13/20* (2013.01); *F16D 2121/14* (2013.01);
(Continued)

(58) Field of Classification Search
CPC ........ F16D 55/226; F16D 65/14; F16D 65/18; F16D 65/183; F16D 2121/14; B60T 13/74; B60T 13/746
(Continued)

(56) References Cited

U.S. PATENT DOCUMENTS

2003/0102192 A1* 6/2003 Kapaan ................... F16H 25/20
188/72.7
2003/0178264 A1* 9/2003 Halasy-Wimmer ..... F16D 65/18
188/158
(Continued)

*Primary Examiner* — Christopher P Schwartz
(74) *Attorney, Agent, or Firm* — CBM Patent Consulting, LLC

(57) ABSTRACT

A motor-driven friction braking device for a rail vehicle is mainly composed of a torque motor, a speed reduction mechanism, an electromagnetic brake (1), a screw nut transmission mechanism and a brake friction pair (9). The torque motor, a screw (7), the speed reduction mechanism and the electromagnetic brake (1) are coaxially mounted; the torque motor is fixedly connected to the speed reduction mechanism, and the speed reduction mechanism is fixedly connected to the screw (7); the screw (7) is in non-self-locking threaded connection with a nut (8), and one end of the nut (8) is connected to the brake friction pair (9); and the electromagnetic brake (1) is mounted on the screw (7).

7 Claims, 1 Drawing Sheet

(51) Int. Cl.
  *F16D 121/14*  (2012.01)
  *F16D 121/20*  (2012.01)
  *F16D 121/24*  (2012.01)
  *F16D 125/40*  (2012.01)
  *F16D 127/06*  (2012.01)

(52) U.S. Cl.
  CPC ...... *F16D 2121/20* (2013.01); *F16D 2121/24* (2013.01); *F16D 2125/40* (2013.01); *F16D 2127/06* (2013.01)

(58) Field of Classification Search
  USPC .......... 188/72.1, 72.6–72.8, 153 R, 156–164
  See application file for complete search history.

(56)  References Cited

U.S. PATENT DOCUMENTS

2006/0032712 A1*  2/2006  Kollaard ................ F16D 28/00
  188/72.8
  2013/0299288 A1* 11/2013  Ryu ..................... F16D 55/226
  188/72.4
  2018/0142747 A1*  5/2018  Nanahara ............... F16D 65/18

* cited by examiner

MECHANICAL FORCE-AMPLIFYING TYPE MOTOR-DRIVEN FRICTION BRAKING DEVICE FOR RAIL VEHICLE

TECHNICAL FIELD

The present invention belongs to the technical field of braking systems for rail vehicle, and more particularly relates to a motor-driven friction braking device for a rail vehicle.

BACKGROUND

For a long time, brake systems for rail transit vehicles have been air brakes. Compared with hydraulic transmission, the air brake has low pressure and poor force transmission efficiency, and requires a larger brake cylinder and various valve bodies to meet the braking force requirements. Therefore, the air brake has relatively large volume and weight and a complicated structure and is difficult to control, and also takes up a lot of space, which is not conducive to the lightweight design of rail vehicles. So, a hydraulic braking system is gradually developed. Compared with the air brake system, the hydraulic brake system is reduced in both overall volume and weight, simpler in control and thus suitable for urban rail transit vehicles with limited installation space. However, after all, the braking force is still transmitted by a medium, pipelines and valve bodies of the hydraulic braking system are still complicated, accompanied with a risk of oil leakage. Currently, the hydraulic braking system is only used for urban rail vehicles.

In this context, the present invention completely changes a power generation mode and a force transmission mode, and provides a device for generating a force through a motor and transmitting and amplifying the force by a machine. Therefore, the braking system is more compact, smaller in volume, more convenient to control, lighter in mass, and more suitable for rail vehicles with small bottom space.

SUMMARY

The object of the present invention is to provide a mechanical force-amplifying type motor-driven friction braking device for a rail vehicle, which can implement an electrically-driven braking system for a rail vehicle.

To fulfill said object, a mechanical force-amplifying type motor-driven friction braking device for a rail vehicle is designed, which comprises a torque motor, a speed reduction mechanism, an electromagnetic brake, a nut, a screw and a brake friction pair, wherein the torque motor comprises a torque motor rotor and a torque motor body; the speed reduction mechanism is composed of a sun gear, a planet gear, and a planet gear carrier; the torque motor is of a hollow structure; the screw is inserted into the hollow part of the torque motor and is coaxial with the torque motor; the torque motor rotor is fixedly connected to the sun gear; the planet gear carrier is fixedly connected to the screw; the screw is sleeved with the nut and is in non-self-locking threaded connection with the nut; one end of the nut is connected to the brake friction pair; the electromagnetic brake sleeves the screw; the torque motor rotor generates a braking torque which is transmitted to the braking friction pair through the speed reduction mechanism, the screw and the nut in sequence to achieve braking.

In a preferred embodiment, the torque motor is a hollow torque motor, a screw is inserted into the hollow part of the torque motor, and the torque motor rotor is fixedly connected to the sun gear; when the torque motor rotor rotates forward, an adjustable torque is output to the screw through the speed reduction mechanism to implement braking; when the torque motor rotor rotates reversely, releasing is implemented.

In a preferred embodiment, the speed reduction mechanism is composed of a sun gear, a planet gear, and a planet gear carrier, wherein the sun gear is fixedly connected to the torque motor rotor as an input; and the planet gear carrier is fixedly connected to the screw as an output.

In a preferred embodiment, the screw is in non-self-locking threaded connection with the nut; and the nut converts a rotational motion of the screw into an axial motion and outputs an axial thrust.

In a preferred embodiment, when the electromagnetic brake is de-energized, the screw is connected to the electromagnetic brake and cannot rotate freely; when the electromagnetic brake is energized, the screw is disengaged from the electromagnetic brake and can rotate freely.

In a preferred embodiment, after the braking force is applied, the electromagnetic brake is powered off to lock the screw, and then the torque motor is stopped to maintain the thrust of the nut.

A braking method for a mechanical force-amplifying motor-driven friction braking device is as follows: when the torque motor rotor rotates forward, a braking torque is generated, and the electromagnetic brake and the screw are electrically separated; the torque motor rotor drives the sun gear to rotate, and the screw rotates through the planet gear and the planet gear carrier, and the nut makes a translational motion by means of the rotation of the screw, resulting in an axial motion; a brake friction pair installed on one end of the nut generates a brake clamping force; if the electromagnetic brake is powered off, the electromagnetic brake will lock the screw and the braking force will be maintained; when the torque motor rotor rotates reversely, the corresponding nut makes a translational motion reversely, and the brake friction pair is released.

The beneficial effects of the present invention include, but are limited to the followings: the device changes a power generation mode and a force transmission mode, and provides a device for generating a force by a motor and transmitting and amplifying the force by a machine, such that the brake system is compact, small in size, convenient to control, and light in weight, and thus suitable for rail vehicles with a small bottom space.

Figure 1:
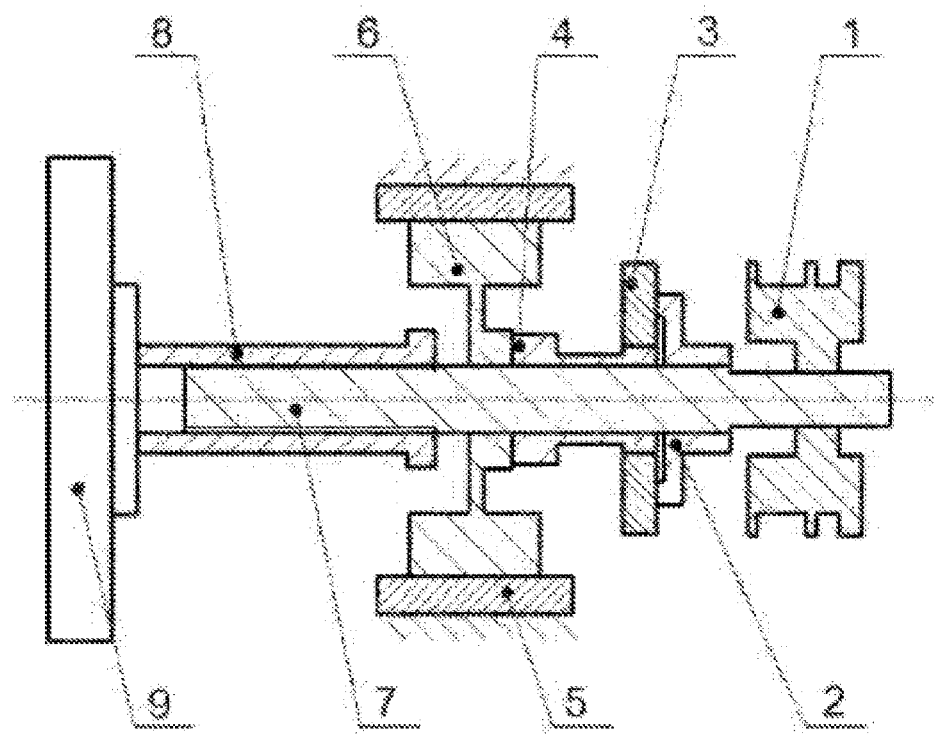
FIG. 1 illustrates a schematic diagram of a device of the present invention according to an embodiment of the present invention.

In drawings, reference symbols represent the following components: 1—electromagnetic brake, 2—planet gear carrier, 3—planet gear, 4—sun gear, 5—torque motor body, 6—torque motor rotor, 7—screw, 8—nut, 9—brake friction pair.

DETAILED DESCRIPTION

The present invention will be further described below with reference to the accompanying drawings. The structure and principle of this device are very clear to those skilled in the art. It should be understood that the specific embodiments described herein are only used to explain the present invention and are not intended to limit the present invention.

The following detailed description refers to the accompanying drawings, which form a part of the detailed description. In the drawings, similar symbols typically identify similar components, unless context dictates otherwise. The illustrative embodiments described in the detailed description, drawings and claims are not intended to be limitative. Other embodiments may be used, and other changes may be made, without departing from the spirit or scope of the subject matter provided by the present invention.

As shown in FIG. 1, a mechanical force-amplifying motor-driven friction braking device for a rail vehicle comprises a torque motor, a speed reduction mechanism, an electromagnetic brake (1), a nut (8), a screw (7) and a brake friction pair (9), wherein the torque motor comprises a torque motor rotor (6) and a torque motor body (5); the speed reduction mechanism is composed of a sun gear (4), a planet gear (3) and a planet gear carrier (2); the torque motor is of a hollow structure; the screw (7) is inserted into the hollow part of the torque motor and is coaxial with the torque motor; the torque motor rotor (6) is fixedly connected to the sun gear (4); the planet gear carrier (2) is fixedly connected to the screw (7); the screw (7) is sleeved with the nut (8) and is in non-self-locking threaded connection with the nut (8); one end of the nut (8) is connected to the brake friction pair (9); the electromagnetic brake (1) sleeves the screw (7) and is used to control a locked state and a freely rotating state of the screw (7); the torque motor rotor (6) generates a braking torque which is transmitted to the braking friction pair (9) through the speed reduction mechanism, the screw (7) and the nut (8) in sequence to achieve braking.

The torque motor is a hollow torque motor, a screw (7) is inserted into the hollow part of the torque motor, and the torque motor rotor (6) is fixedly connected to the sun gear (4); when the torque motor rotor (6) rotates forward, an adjustable torque is output to the screw (7) through the speed reduction mechanism to implement braking; when the torque motor rotor (6) rotates reversely, releasing is implemented.

The speed reduction mechanism is composed of a sun gear (4), a planet gear (3), and a planet gear carrier (2), wherein the sun gear (4) is fixedly connected to the torque motor rotor (6) as an input; and the planet gear carrier (2) is fixedly connected to the screw (7) as an output.

The screw (7) is in non-self-locking threaded connection with the nut (8); and the nut (8) converts a rotational motion of the screw (7) into an axial motion and outputs an axial thrust, thereby implementing braking and releasing.

When the electromagnetic brake (1) is de-energized, the screw (7) is connected to the electromagnetic brake (1) and cannot rotate freely; when the electromagnetic brake (1) is energized, the screw (7) is disengaged from the electromagnetic brake (1) and can rotate freely.

After the braking force is applied, the electromagnetic brake (1) is powered off to lock the screw (7), and then the torque motor is stopped to maintain the thrust of the nut (8), thereby implementing parking brake.

As shown in FIG. 1, a braking method for the mechanical force-amplifying motor-driven friction braking device is as follows: when the torque motor rotor (6) rotates forward, a braking torque is generated, and the electromagnetic brake (1) and the screw (7) are electrically separated; the torque motor rotor (6) drives the sun gear (6) to rotate, and the screw (7) rotates through the planet gear (3) and the planet gear carrier (2), and the nut (8) makes a translational motion by means of the rotation of the screw (7), resulting in an axial motion; a brake friction pair (9) installed on one end of the nut (8) generates a brake clamping force; if the electromagnetic brake (1) is powered off, the electromagnetic brake (1) will lock the screw (7) and the braking force will be maintained; when the torque motor rotor (6) rotates reversely, the corresponding nut (8) makes a translational motion reversely, and the brake friction pair is released.

Although some solutions and embodiments have been disclosed herein, other solutions and embodiments will be apparent to those skilled in the art. The various solutions and embodiments disclosed herein are exemplary and are not intended to be limitative, the true scope and spirit being indicated by the appended claims.

What is claimed is:

1. A mechanical force-amplifying motor-driven friction braking device for a rail vehicle, comprising a torque motor, a speed reduction mechanism, an electromagnetic brake (1), a nut (8), a screw (7) and a brake friction pair (9), wherein the torque motor comprises a torque motor rotor (6) and a torque motor body (5); the speed reduction mechanism is composed of a sun gear (4), a planet gear (3) and a planet gear carrier (2); the torque motor is of a hollow structure; the screw (7) is inserted into the hollow structure of the torque motor and is coaxial with the torque motor; the torque motor rotor (6) is fixedly connected to the sun gear (4); the planet gear carrier (2) is fixedly connected to the screw (7); the screw (7) is sleeved with the nut (8) and is in non-self-locking threaded connection with the nut (8); one end of the nut (8) is connected to the brake friction pair (9); the electromagnetic brake (1) is sleeved with the screw (7); the torque motor rotor (6) generates a braking torque which is transmitted to the braking friction pair (9) through the speed reduction mechanism, the screw (7) and the nut (8) in sequence to achieve braking.

2. The mechanical force-amplifying motor-driven friction braking device for the rail vehicle according to claim 1, wherein when the torque motor rotor (6) rotates forward, an adjustable torque is output to the screw (7) through the speed reduction mechanism to implement braking; when the torque motor rotor (6) rotates reversely, releasing is implemented.

3. The mechanical force-amplifying motor-driven friction braking device for the rail vehicle according to claim 1, wherein the sun gear (4) is fixedly connected to the torque motor rotor (6) as an input; and the planet gear carrier (2) is fixedly connected to the screw (7) as an output.

4. The mechanical force-amplifying motor-driven friction braking device for the rail vehicle according to claim 1, wherein the screw (7) is in non-self-locking threaded connection with the nut (8); and the nut (8) converts a rotational motion of the screw (7) into an axial motion and outputs an axial thrust.

5. The mechanical force-amplifying motor-driven friction braking device for the rail vehicle according to claim 1, wherein when the electromagnetic brake (1) is de-energized, the screw (7) is connected to the electromagnetic brake (1) and cannot rotate freely; when the electromagnetic brake (1) is energized, the screw (7) is disengaged from the electromagnetic brake (1) and can rotate freely.

6. The mechanical force-amplifying motor-driven friction braking device for the rail vehicle according to claim 1, wherein after the braking force is applied, the electromagnetic brake (1) is powered off to lock the screw (7), and then the torque motor is stopped to maintain the thrust of the nut (8).

7. A braking method for the mechanical force-amplifying motor-driven friction braking device for the rail vehicle according to claim 1, wherein when the torque motor rotor (6) rotates forward, a braking torque is generated, and the electromagnetic brake (1) and the screw (7) are electrically separated; the torque motor rotor (6) drives the sun gear (4) to rotate, and the screw (7) rotates through the planet gear (3) and the planet gear carrier (2), and the nut (8) makes a translational motion by means of the rotation of the screw, resulting in an axial motion; a brake friction pair (9) installed on one end of the nut (8) generates a brake clamping force; if the electromagnetic brake (1) is powered off, the electromagnetic brake (1) will lock the screw (7) and the braking force will be maintained; when the torque motor rotor (6) rotates reversely, the corresponding nut (8) makes a translational motion reversely, and the brake friction pair is released.

\* \* \* \* \*